United States Patent [19]

Kadono et al.

[11] Patent Number: 4,652,621

[45] Date of Patent: Mar. 24, 1987

[54] NOVEL WATER-SOLUBLE COPOLYMER

[75] Inventors: Hiromitsu Kadono, Yokohama; Tadao Natsuume, Yokosuka, both of Japan

[73] Assignee: Nippon Zeon Co., Ltd., Tokyo, Japan

[21] Appl. No.: 658,165

[22] Filed: Oct. 5, 1984

[30] Foreign Application Priority Data

Oct. 6, 1983 [JP] Japan .................................. 58-187489

[51] Int. Cl.$^4$ ............................................. C08F 20/52
[52] U.S. Cl. .................................. 526/262; 252/8.551
[58] Field of Search ........................ 526/240, 262, 287

[56] References Cited

U.S. PATENT DOCUMENTS 3,039,870  6/1962  Laakso et al. ...................... 526/262
3,052,656  9/1962  Groene et al. ...................... 526/287
3,725,356  4/1973  Lüders et al. ...................... 526/262

Primary Examiner—Paul R. Michl
Attorney, Agent, or Firm—Sherman & Shalloway

[57] ABSTRACT

A novel water-soluble copolymer which is characterized by being an addition copolymer comprising 5–70 mole % of (a) an N-substituted $\alpha,\beta$-unsaturated dicarboxylic acid 5-membered ring imide having a sulfo or sulfoxy group-containing residue attached to the nitrogen atom, 30–95 mole % of (b) an $\alpha,\beta$-unsaturated aliphatic monocarboxylic acid and 0–50 mole % of (c) and $\alpha,\beta$-unsaturated aliphatic dicarboxylic acid and having a number average molecular weight of 500–5,000,000, and a salt thereof.

17 Claims, No Drawings

NOVEL WATER-SOLUBLE COPOLYMER

This invention relates to a novel water-soluble polymeric sulfonic acid or sulfate and a salt thereof. More specifically, it relates to a water-soluble polymeric sulfonic acid or sulfate and a salt thereof suitable as a dispersant for drilling fluids, which utilizes an imide derived from an amine containing a sulfo group or sulfoxy group and an $\alpha,\beta$-unsaturated aliphatic dicarboxylic acid and an $\alpha,\beta$-unsaturated aliphatic monocarboxylic acid as essential components.

Various water-soluble polymers containing sulfonic acid or sulfate groups in the molecule have heretofore been synthesized. Their specific examples include (1) an acid imide compound of maleic anhydride homopolymer or a copolymer of maleic anhydride and a vinyl monomer such as a monoolefin, a vinyl ester, a vinyl ether, acrylamide and an acrylic acid ester with an amine containing a sulfonic acid group (for example, U.S. Pat. No. 3,039,870 and British Pat. No. 1,246,953), (2) a homopolymer of an acrylamidosulfonic acid compound such as 2-acrylamido-3-methylpropanesulfonic acid (hereinafter referred to as AMPS) or a copolymer of this compound and a vinyl monomer such as acrylic acid, maleic acid, and acrylamide (for example, U.S. Pat. No. 3,547,899 and U.S. Pat. No. 3,806,367), and (3) a copolymer of styrenesulfonic acid and maleic anhydride (for example, U.S. Pat. No. 3,720,900).

These polymeric sulfonic acids are known to be useful in various fields, for example, as photographic materials, water treating agents, cosmetic additives and various dispersants (see the aforesaid patents). Particularly, the aforesaid (3) copolymer of styrenesulfonic acid and maleic anhydride (hereinafter referred to as SSM) has excellent performance as a dispersant for drilling fluids for drilling wells (for example, oil or gas drilling, construction of geothermoelectric power plants, etc.) which have been increasingly demanded lately (the aforesaid U.S. Pat. No. 3,730,900, etc.).

Specifically, SSM has higher stability at high temperatures and higher stability to polyvalent metal ions such as calcium and magnesium ions and sodium chloride than other commercially available dispersants for drilling fluids, such as sodium ligninsulfonate, sodium iron-chromium-sulfonate, sodium humate, and AMPS polymer.

However, even such SSM markedly decreases in dispersing performance when used at a temperature of 250° C. or higher. It also has the economic disadvantage that the sulfonation reaction for producing SSM is complicated and the cost of production is high.

The present inventors have extensively worked for the purpose of developing a drilling fluid dispersant which can be produced by simple operations and has higher performance than SSM, and, as a result, have discovered that among the polymers having sulfonic acid or sulfate groups, a novel copolymer which comprises (a) an N-substituted $\alpha,\beta$-unsaturated aliphatic dicarboxylic acid 5-membered ring imide substituted with a substituent containing a sulfo or sulfooxy group and (b) an $\alpha,\beta$-unsaturated monocarboxylic acid as essential components has especially excellent performance. This discovery has led to this invention.

According to this invention, there is provided a novel water-soluble copolymer which is an addition copolymer comprising 5–70 mole % of (a) an N-substituted $\alpha,\beta$-unsaturated dicarboxylic acid 5-membered ring imide having a residue containing a sulfo group or sulfooxy group attached to the nitrogen atom, 30–95 mole % of (b) an $\alpha,\beta$-unsaturated aliphatic monocarboxylic acid and 0–50 mole % of (c) an $\alpha,\beta$-unsaturated aliphatic dicarboxylic acid and having a number average molecular weight of 500–5,000,000 and a salt thereof.

The novel polymeric sulfonic acid or polymers having sulfooxy groups of this invention contains the aforesaid monomer units (a) and (b) as essential components and further, if desired, contains the monomer unit (c). The content of the monomer unit (a) is 5–70 mole %, preferably 10–60 mole %, and if its content is unduly small, the dispersibility of the polymer in a water-based mud system containing a high concentration of sodium chloride or calcium ions or its dispersibility at high temperatures is not adequate. If it is too high, on the other hand, the gel strength of the polymer at high temperatures is increased and hence its dispersion performance is reduced.

The content of the monomer unit (b) is 30–95 mole %, preferably 40–90 mole %. If its content is too small or too large, the dispersion performance is generally reduced, particularly at high temperatures.

Although the monomer unit (c) is not essential, it may be included in a proportion of up to 50 mole %, preferably 10–40 mole %, in which case the stability at high temperatures, especially in a system wherein polyvalent metal ions are present in a high concentration at a high temperature, is further improved and also an economic advantage such as a reduction in the cost of production is brought about. If desired, the polymer of this invention may also contain a unit derived from another copolymerizable vinyl monomer so long as the use of the additional vinyl monomer does not interefere with the effect of this invention.

The first monomer unit (a) which constitutes the polymeric sulfonic acid or polymers having sulfooxy groups of this invention is an addition polymerized type unit of an $\alpha,\beta$-unsaturated aliphatic dicarboxylic acid imide having a sulfonic acid 5-membered ring group attached through the acid imide linkage.

The sulfonic acid group (sulfo group) is represented by —SO$_3$H and the sulfooxy groups are represented by —OSO$_3$H.

Specific examples of such an acid imide include 5-membered ring imides derived from an $\alpha,\beta$-unsaturated aliphatic dicarboxylic acid such as maleic acid, citraconic acid and itaconic acid, and primary amino group-containing sulfonic acids or sulfates having 1 to 3 sulfo or sulfooxy groups such as aminomethanesulfonic acid, aminoethanesulfonic acid, amino-2-methylpropanesulfonic acid, aminobutanesulfonic acid, anilinemonosulfonic acid, anilinedisulfonic acid, aminotoluenesulfonic acid, naphthylaminemonosulfonic acid, naphthylaminedisulfonic acid, naphthylaminetrisulfonic acid, sulfamide, aminoethyl hydrogen sulfate, aminopropyl hydrogen sulfate, aminobutyl hydrogen sulfate, aminohexyl hydrogensulfate and aminooctyl hydrogensulfate.

Among these examples of the unit (a), the imides of the $\alpha,\beta$-unsaturated aliphatic dicarboxylic acid and the aliphatic or aromatic sulfonic acid having 1 to 10 carbon atoms are preferred.

If maleic acid imide is taken up as an example, the monomer unit (a) is represented by the following general formula [I]

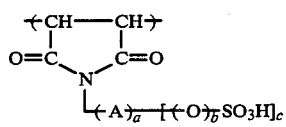

wherein A represents an organic residue having a valence of 2 to 4, a and b are both 0 or 1, and c represents an integer of 1 to 3, provided that when b is 1, c is 1.

The second monomer unit (b) is an addition polymerized type unit of the α,β-unsaturated aliphatic monocarboxylic acid, and specific examples of such an acid include acrylic acid, methacrylic acid and crotonic acid.

If acrylic acid is taken up as an example, the monomer unit (b) is represented by the following formula [II]

The third monomer unit (c) is an addition polymerized type unit of an α,β-unsaturated aliphatic dicarboxylic acid, and specific examples of the α,β-unsaturated aliphatic dicarboxylic acid include those falling within the same category as those exemplified under the aforesaid (a).

If maleic acid is taken up as an example, the monomer unit (c) is represented by the following formula [III]

The polymeric sulfonic acid or sulfate having such a composition according to this invention is an addition-type polymer in which the above-described monomer units are joined randomly. It has a number average molecular weight of generally 500–5,000,000, preferably 1,000–2,000,000; when used as a dispersant for drilling fluids for drilling wells, number average molecular weights of 500–100,000, especially 1,000–50,000, are suitable.

A part or the whole of the sulfo groups or sulfooxy groups and carboxyl groups present in the molecule of the polymeric sulfonic acid or sulfate of this invention may be combined with monovalent or polyvalent cations to form a salt, and specific examples of such a salt include alkali metal or alkaline earth metal salts such as those with sodium, potassium, magnesium, calcium, barium etc., ammonium salts, amine salts with trimethylamine, triethylamine, triethanolamine, etc. Among these the alkali metal salts are most advantageously employed in view of economy, safety, dispersion performance, etc.

The process for the production of the polymeric sulfonic acid or sulfate of this invention is not particularly restricted and any process which permits the formation of a polymer having the above-described composition may be employed. The processes therefore may be roughly classified into two, i.e. (i) a process which comprises simultaneously copolymerizing the aforesaid monomers in a conventional manner, and (ii) a process which comprises copolymerizing an α,β-unsaturated aliphatic dicarboxylic acid or an anhydride thereof and an α,β-unsaturated aliphatic monocarboxylic acid and subsequently modifying the resultant copolymer with a sulfonic acid or sulfate containing an amino group, the latter process being advantageous in view of the availability of the starting materials, easiness of the reaction, productivity, etc.

Specific examples of such process (ii) are (1) a process which comprises reacting a copolymer of an α,β-unsaturated aliphatic dicarboxylic anhydride and an α,β-unsaturated aliphatic monocarboxylic acid with a sulfonic acid or sulfate containing an amino group in a non-aqueous solvent system at a high temperature (see U.S. Pat. No. 3,039,870), (2) a process which comprises adding the aforesaid copolymer to an aqueous solution of a salt of a sulfonic acid or sulfate containing an amino group and reacting them at a high temperature (see British Pat. No. 1,246,953), and (3) a process which comprises adding a salt of a sulfonic acid or sulfate containing an amino group to an aqueous solution of a salt of a copolymer of an α,β-unsaturated aliphatic dicarboxylic acid and an α,β-unsaturated aliphatic monocarboxylic acid and reacting them at a high temperature.

When the product in the form of an acid is obtained by these processes, it may be converted into a salt, if necessary, by neutralizing it in the presence of a base in a conventional manner. On the contrary, if the product is in the form of a salt, it may be converted into an acid form by treating it with a strong acid such as sulfuric acid, hydrochloric acid, strongly acidic ion exchange resins, etc.

The polymeric sulfonic acid and polymeric sulfate of this invention thus prepared may be recovered in the form of an aqueous solution, but, if necessary, it may also be obtained in the form of a solid such as a polymer or granules by removing water in a conventional manner.

The polymeric sulfonic acids and sulfates of this invention thus obtained are novel polymers containing carboxyl groups and sulfo groups or sulfooxy groups in the molecule and having an acid imide structure, which may be used like the known polymeric sulfonic acids in the fields of, for example, cosmetic additives, reinforcing agents for hair dressings, tanning agents, cement dispersants, gypsum dispersants, dispersants for paints, dispersants for dyestuffs, and water treating agents. Particularly, they are very useful as additives for aqueous drilling fluids used in the drilling of subterranean wells. They have superior dispersibility, stability at high temperatures, and stability to polyvalent metal ions and sodium chloride compared to SSM generally employed in this art.

This invention is more particularly described by the following examples. In the examples, all the parts and % are by weight unless otherwise stated.

EXAMPLE 1

To 1333 parts (solid content 40%) of an aqueous solution of a sodium salt of a copolymer (Polymer A; number average molecular weight 3,000) comprising 50 mole % of maleic acid and 50 mole % of acrylic acid obtained by radical polymerization was added 175 parts of aminoethanesulfonic acid, followed by the addition of sulfonic acid to adjust the pH of the mixture to 6. The mixture was then stirred at 160° C. for 5 hours. As a result, a reaction mixture having a Gardner color scale of 10 and a pH of 6.5 was obtained.

On analysis by high performance liquid chromatography, the reaction mixture was found to contain no unreacted aminoethanesulfonic acid. Thereafter, it was analyzed by IR. A doublet absorption characteristic of the 5-membered cyclic imide was observed at 1700 cm$^{-1}$ and 1770 cm$^{-1}$. On the other hand, the IR spectrum showed no absorptions at 1650 and 1690 cm$^{-1}$ for the acid amide nor an absorption at 1710 cm$^{-1}$ for the 6-membered cyclic imide.

From the above results, it was confirmed that the 5-membered cyclic acid imide had been selectively produced, and since the amount of the aminoethanesulfonic acid charged corresponded to the stoichiometric amount of the maleic acid unit in Polymer A, this product was found to be a partial sodium salt of a copolymer of 50 mole % of N-sulfoethylmaleimide and 50 mole % of acrylic acid. The viscosity of this copolymer in a 40% aqueous solution at 25° C. was about 50 cps.

Thereafter, the performance of this copolymer as a dispersant for drilling fluids was evaluated according to the following test conditions. The results are given in Table 1.

1. Test on Heat Resistance 6.8 parts of 100% Wyoming bentonite, 18.1 parts of East Texas bentonite clay and 241.3 parts of fresh water were mixed in a homogenizer and allowed to stand at room temperature for 24 hours to obtain a water-based mud. To 100 parts of the mud were added 1.7 parts (solid basis) of iron- and chromium-treated lignin as a dispersion aid and 0.57 part (solid basis) of said copolymer, and the pH of the mixture was adjusted to pH 10 with a 10% aqueous sodium hydroxide solution.

The mud composition thus obtained was tested for heat resistance by measuring its flow characteristics at room temperature using a rheometer (Fann Viscometer Model 35) before and after heating at 500° F. in an autoclave for 16 hours.

2. Test on Resistance to Salt Water 2 parts (solid basis) of the aforesaid copolymer was added to 350 parts of a 25% aqueous NaCl solution containing 2000 ppm of calcium ions. Then, a 5% aqueous NaOH solution was added with stirring to increase the pH of the mixture gradually and the pH value at which turbidity first appeared was measured.

EXAMPLE 2

The reaction was conducted in a manner similar to that in Example 1 except that the amount of the aminoethanesulfonic acid charged was changed to 105 parts (corresponding to 60% of the maleic acid unit in Polymer A). By the same analysis as in Example 1, it was found to be a polymer having the composition set forth in Table 1. The dispersing performance of this polymer was tested in the same way as in Example 1, and the results are given in Table 1.

EXAMPLE 3

The reaction was conducted in a similar manner to that in Example 1 except that the amount of the aminoethanesulfonic acid charged was changed to 70 parts (corresponding to 40% of the maleic acid unit in Polymer A). By the same analysis as in Example 1, the product was found to be a polymer having the composition set forth in Table 1. The dispersing performance of the polymer was also tested in the same way as in Example 1. The results are given in Table 1.

EXAMPLE 4

The reaction was conducted in a similar manner to that in Example 1 except that to 100 parts (solid content 40%) of an aqueous solution of a sodium salt of a copolymer (Polymer B, number average molecular weight 10,000) comprising 30 mole % of maleic acid and 70 mole % of acrylic acid obtained by radical polymerization was added 3.5 parts (corresponding to 10 mole % of the total monomer units of Polymer B) of aminoethanesulfonic acid. By the same analysis as in Example 1, the product was found to be a polymer having the composition set forth in Table 1. The dispersing performance of this polymer was evaluated similarly, and the results are given in Table 1.

COMPARATIVE EXAMPLE 1

The reaction was conducted in a similar manner to that in Example 1 except that to 100 parts (solid content 40%) of an aqueous solution of a sodium salt of a polymaleic acid (Polymer C; number average molecular weight 1,000) was added 31.3 parts (the stoichiometric amount of the total monomer units of the polymer). By the same analysis as in Example 1, the product was found to be a polymer having the composition set forth in Table 1. The dispersing performance of this polymer of aminoethane sulfonic acid was evaluated similarly, and the results are given in Table 1.

COMPARATIVE EXAMPLE 2

Commercial SSM (trade name: MILTEMP, produced by MILCHEM CO.) was evaluated for its performance as a dispersant for drilling fluids in the same way as in Example 1. The results are given in Table 1.

COMPARATIVE EXAMPLE 3

A sodium salt of an AMPS polymer (Polymer D; number average molecular weight 10,000) obtained by radical polymerization was evaluated for its performance as a dispersant for drilling fluids in the same way as in Example 1. The results are given in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Starting Polymer | A | A | A | B | C | Commercial Product (SSM) | D |
| Polymer Composition (mole %) | | | | | | | |
| (a) N—Sulfoethylmaleimide | 50 | 30 | 20 | 10 | 100 | | |
| (b) Acrylic Acid | 50 | 50 | 50 | 70 | — | | |
| (c) Maleic Acid | — | 20 | 30 | 20 | — | | |
| Viscosity of 40% Aqueous Solution (cps) | 50 | 50 | 50 | 100 | Not Measured | Not Measured | Not Measured |
| 1. Test on Heat Resistance | | | | | | | |
| (I) Before Test | | | | | | | |

TABLE 1-continued

|  | Example | | | | Comparative Example | | |
| --- | --- | --- | --- | --- | --- | --- | --- |
|  | 1 | 2 | 3 | 4 | 1 | 2 | 3 |
| pH | 10.9 | 11.3 | 11.5 | 10.5 | 10.5 | 11.1 | 10.5 |
| Apparent Viscosity (cps) | 11 | 10.5 | 10.5 | 10.5 | 18 | 21 | 96 |
| Plastic Viscosity (cps) | 10 | 9 | 9 | 9 | 15 | 18 | 57 |
| Yield Value (Lb/100 ft$^2$) | 2 | 1 | 1 | 1 | 7 | 7 | 78 |
| Gel Strength (Lb/100 ft$^2$) | | | | | | | |
| 10 sec | 0.5 | 0.5 | 0.5 | 0.5 | 1 | 2 | 22 |
| 10 min | 0.5 | 0.5 | 0.5 | 0.5 | 13 | 25 | 27 |
| (II) After Test | | | | | | | |
| pH | 11.1 | 11.1 | 11.2 | 11.0 | 10.5 | 10.5 | 11.0 |
| Apparent Viscosity (cps) | 11 | 11.5 | 13 | 11.5 | 30 | 28 | Gelled |
| Plastic Viscosity (cps) | 10 | 11 | 12 | 11 | 25 | 23 | Not Measurable |
| Yield Value (Lb/100 ft$^2$) | 2 | 1 | 2 | 1 | 11 | 9 | Not Measurable |
| Gel Strength (Lb/100 ft$^2$) | | | | | | | |
| 10 sec | 1.5 | 0.5 | 1 | 0.5 | 2 | 1 | Not Measurable |
| 10 min | 1.5 | 0.5 | 1 | 0.5 | 36 | 27 | Not Measurable |
| 2. Text on Resistance to Salt Water (pH) | 13 | 13 | 13 | 11.5 | 13 | 11.5 | 7 |

EXAMPLES 5-9

The reactions were conducted respectively in a similar manner to that in Example 2 except that the aminoethanesulfonic acid was replaced by the various imidizing agents set forth in Table 2 respectively and that the pH of the reaction system was appropriately changed in the range of 2-7. The amount of the imidizing agent used in each example corresponded to 20 mole % based on the total monomer units of Polymer A. The products of these reactions were analyzed by the same procedures as in Example 1, to find that the maleic acid unit in the polymer had been selectively imidized in each case.

When the product of Example 9 was analyzed by IR, a doublet absorption characteristic of the ester bonds was observed at 1440-1350 cm$^{-1}$ and 1230-1150 cm$^{-1}$.

The polymers were each evaluated for dispersion performance in the same way as in Example 1, and the results are given in Table 2.

TABLE 2

| Example | 5 | 6 | 7 | 8 | 9 |
| --- | --- | --- | --- | --- | --- |
| Imidizing agent | Amino methane- sulfonic acid | Sodium aniline- monosul fonate | Aniline disulfo- nic acid | Naphthyl amine- tri- sulfonic acid | Amino- ethyl hydrogen sulfate |
| Viscosity of 40% Aqueous Solution (cps) | 50 | 50 | 50 | 50 | 50 |
| 1. Test on Heat Resistance | | | | | |
| (I) Before Test | | | | | |
| pH | 11.1 | 11.3 | 11.5 | 11.0 | 11.0 |
| Apparent Viscosity (cps) | 11 | 10.5 | 12 | 12 | 17.5 |
| Plastic Viscosity (cps) | 10 | 10 | 11 | 11 | 14 |
| Yield Value (Lb/100 ft$^2$) | 2 | 1 | 2 | 2 | 7 |
| Gel Strength (Lb/100 ft$^2$) | | | | | |
| 10 sec | 0.5 | 0.5 | 1 | 0.5 | 1 |
| 10 min | 0.5 | 1 | 1 | 1 | 2 |
| (II) After Test | | | | | |
| pH | 11.1 | 11.1 | 11.1 | 11.0 | 11.1 |
| Apparent Viscosity (cps) | 11 | 10.5 | 13 | 12.5 | 12.5 |
| Plastic Viscosity (cps) | 10 | 10 | 12 | 12 | 12 |
| Yield Value (Lb/100 ft$^2$) | 2 | 1 | 2 | 1 | 1 |
| Gel Strength (Lb/100 ft$^2$) | | | | | |
| 10 sec | 0.5 | 0.5 | 0.5 | 0.5 | 1 |
| 10 min | 0.5 | 1 | 1 | 1 | 1 |
| 2. Test on Resistance to Salt Water (pH) | 11.5< | 11.5< | 11.5< | 11.5< | 11.5< |

EXAMPLES 10-12

The reactions were conducted respectively in a similar manner to that in Example 2 except that Polymer A was replaced by sodium salts of three copolymers (equimilar copolymers) of maleic acid and acrylic acid having different molecular weights respectively. The amount of the aminoethanesulfonic acid added in each example was that corresponding to 20 mole % based on the total monomer units of each polymer. The products of these reactions were analyzed by the same procedures as in Example 1. It was found that the maleic acid unit in the polymer had been selectively imidized in each case. The polymers were each evaluated for dispersion performance in the same way as in Example 1, and the results are given in Table 3.

TABLE 3

| Example | 10 | 11 | 12 |
|---|---|---|---|
| Starting Polymer | E | F | G |
| Molecular Weight | 5,000 | 10,000 | 30,000 |
| Viscosity of 40% Aqueous solution (cps) | 50 | 100 | 1000 |
| 1. Test on Heat Resistance | | | |
| (I) Before Test | | | |
| pH | 11.5 | 11.3 | 11.3 |
| Apparent Viscosity (cps) | 9.5 | 10 | 11 |
| Plastic Viscosity (cps) | 9 | 9 | 10 |
| Yield Value (Lb/100 ft$^2$) | | | |
| 10 sec | 0.5 | 0.5 | 1 |
| 10 min | 0.5 | 0.5 | 1 |
| (II) After Test | | | |
| pH | 11.4 | 11.3 | 11.4 |
| Apparent Viscosity (cps) | 9.5 | 9.5 | 11 |
| Plastic Viscosity (cps) | 9 | 9 | 10 |
| Yield Value (Lb/100 ft$^2$) | | | |
| 10 sec | 0.5 | 0.5 | 1 |
| 10 min | 0.5 | 0.5 | 1 |
| 2. Test on Resistance to Salt Water (pH) | 11.5< | 11.5< | 11.5< |

EXAMPLE 13

The reaction was conducted in a similar manner to that in Example 1 but using a sodium salt of a copolymer of maleic acid and acrylic acid (copolymer of 20 mole % of maleic acid and 80 mole % of acrylic acid) having a molecular weight of 500,000 instead of Polymer A and by charging the aminoethanesulfonic acid in an amount corresponding to 20 mole % based on the total monomer units. As a result, a product in which the maleic acid unit had been imidized was obtained. The viscosity of this product in a 5% aqueous solution at 25° C. was 500 cps.

Thereafter, the filtrability of this product was examined using a filtered water tester of the API specification, and found to be much lower than that of bentonite. From this result, it will be understood that this product can be employed as a fluid loss controlling agent for drilling fluids.

We claim:

1. A water soluble addition copolymer comprising 10–60 mole % of (a) an N-substituted alpha, beta-unsaturated aliphatic dicarboxylic acid 5-membered ring imide having a sulfo-group-containing or sulfooxy group-containing residue attached to the nitrogen atom, 40–90 mole % of (b) an α,β-unsaturated aliphatic monocarboxylic acid and 0–50 mole % of (c) an α,β-unsaturated aliphatic dicarboxylic acid, said copolymer having a number average molecular weight of 500–5,000,000, or a water soluble salt of said addition copolymer, said copolymer being suitable as a dispersant for drilling fluids.

2. The copolymer according to claim 1 wherein the α,β-unsaturated aliphatic dicarboxylic acid in each of (a) and (c) is maleic acid, citraconic acid or itaconic acid.

3. The copolymer according to claim 1 wherein the sulfo or sulfooxy group-containing residue is a residue having 1 to 3 sulfo or sulfooxy groups.

4. The copolymer according to claim 3 wherein the residue having 1 to 3 sulfo or sulfooxy groups is a residue of an aliphatic or aromatic compound having 1 to 10 carbon atoms and 1 to 3 sulfo or sulfooxy groups attached to said carbon atoms.

5. The copolymer according to claim 1 wherein the α,β-unsaturated aliphatic monocarboxylic acid is acrylic acid, methacrylic acid or crotonic acid.

6. The water-soluble salt of the addition copolymer according to claim 1 wherein the water-soluble salt of the addition copolymer is an alkali metal salt, an alkaline earth metal salt, an ammonium salt or an amine salt.

7. The copolymer salt according to claim 6 wherein the water-soluble salt is an alkali metal salt.

8. The copolymer salt according to claim 7 wherein the alkali metal salt is a sodium salt.

9. The copolymer according to claim 1 wherein the addition copolymer comprises 10–60 mole % of (a) the N-substituted α,β-unsaturated aliphatic dicarboxylic acid imide, 40–90 mole % of (b) the α,β-unsaturated aliphatic monocarboxylic acid and 10–40 mole % of (c) the α,β-unsaturated aliphatic dicarboxylic acid.

10. The copolymer according to claim 1 wherein the number average molecular weight is 1,000–2,000,000.

11. The copolymer according to claim 1 wherein the number average molecular weight is 1,000–50,000.

12. The copolymer according to claim 1 wherein the N-substituted alpha, beta-unsaturated aliphatic dicarboxylic acid 5-membered ring imide having a sulfo or sulfooxy group-containing residue attached to the nitrogen atom is the reaction product of an α,β-unsaturated aliphatic dicarboxylic acid selected from the group consisting of maleic acid, citraconic acid and itaconic acid, and a primary amino group-containing sulfonic acid selected from the group consisting of aminomethanesulfonic acid, aminoethanesulfonic acid, amino-2-methylpropanesulfonic acid, aminobutane sulfonic acid, anilinemonosulfonic acid, anilinedisulfonic acid, aminotoluenesulfonic acid, naphthylaminemonosulfonic acid, naphthylaminedisulfonic acid, and naphthylaminetrisulfonic acid, sulfamic acid (NH$_2$—SO$_3$H), or a primary amino group-containing sulfate selected from the group consisting of aminoethyl hydrogen sulfate, aminopropyl hydrogen sulfate, aminobutyl hydrogen sulfate, aminohexyl hydrogen sulfate and aminooctyl hydrogen sulfate.

13. The copolymer according to claim 1 wherein the α,β-unsaturated aliphatic dicarboxylic acid in each of (a) and (c) is maleic acid, citraconic acid or itaconic acid and wherein the α,β-unsaturated monocarboxylic acid in (b) is acrylic acid, methacrylic acid or crotonic acid.

14. The copolymer according to claim 13 wherein the sulfo or sulfooxy group-containing residue is an aliphatic or aromatic residue having 1 to 10 carbon atoms and from 1 to 3 sulfo or sulfooxy groups attached to said carbon atoms.

15. The copolymer according to claim 1 wherein the monomer (a) is a maleic acid imide represented by the formula (I)

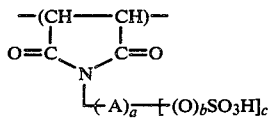

wherein A represents an organic residue of aliphatic, alicyclic or aromatic compounds having a valence of 2 to 4, a and b are both 0 or 1, and c represents an integer of 1 to 3, provided that when b is 1, c is 1.

16. The copolymer according to claim 9 wherein the α,β-unsaturated aliphatic dicarboxylic acid in each of (a) and (c) is maleic acid, citraconic acid or itaconic acid; and the α,β-unsaturated monocarboxylic acid in (b) is acrylic acid, methacrylic acid or crotonic acid.

17. The copolymer according to claim 16 wherein the monomer (a) is a maleic acid imide having the following formula (I)

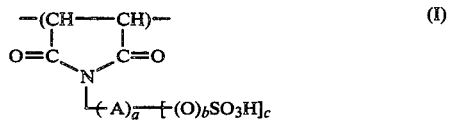

wherein A represents an organic residue of aliphatic, alicyclic or aromatic compounds having a valence of 2 to 4, a and b are both 0 or 1, and c represents an integer of 1 to 3, provided that when b is 1, c is 1.

* * * * *